UNITED STATES PATENT OFFICE.

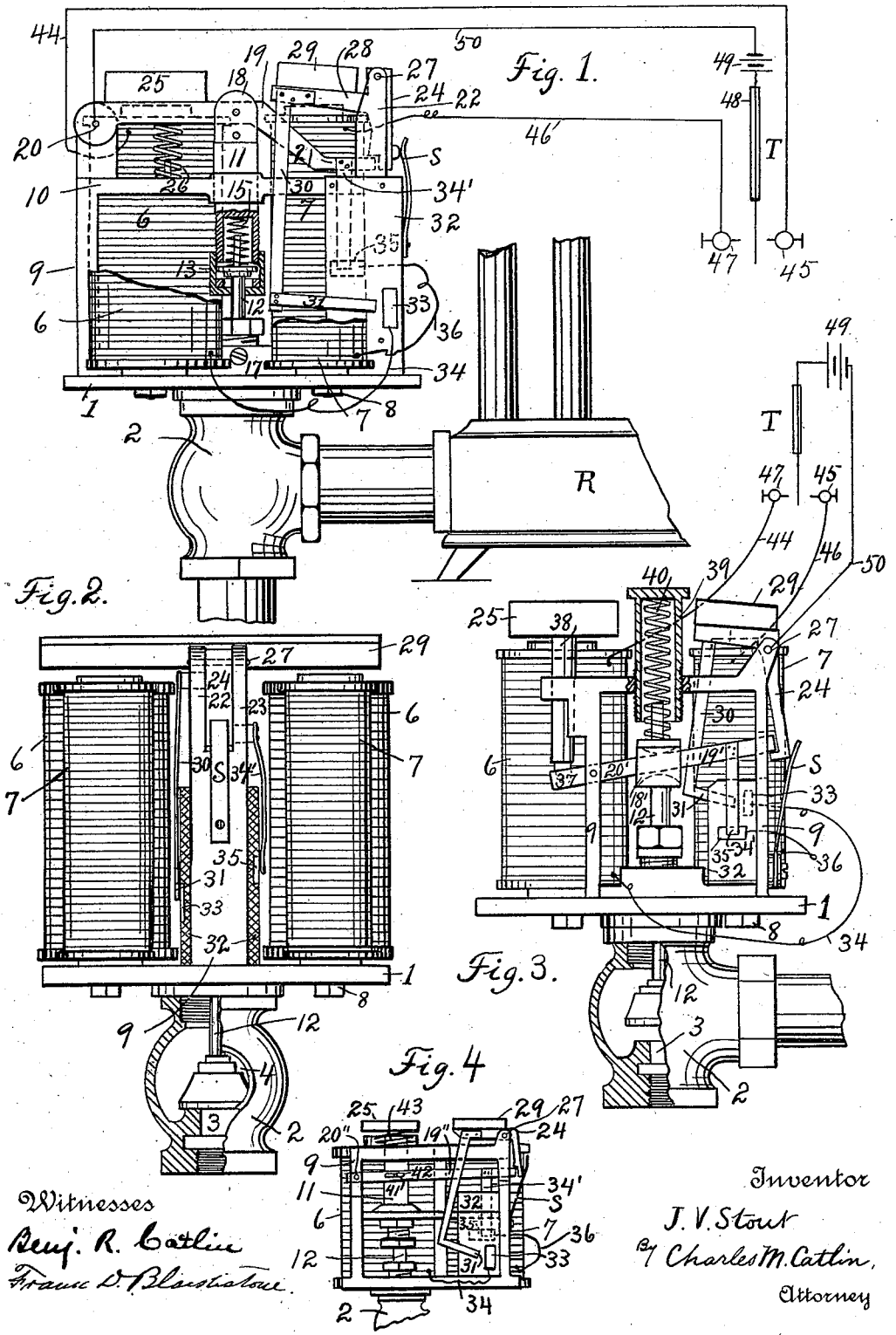

JOHN V. STOUT, OF EASTON, PENNSYLVANIA.

ELECTRIC VALVE APPARATUS.

SPECIFICATION forming part of Letters Patent No. 575,045, dated January 12, 1897.

Application filed June 7, 1892. Serial No. 435,862. (No model.)

*To all whom it may concern:*

Be it known that I, JOHN V. STOUT, a citizen of the United States, residing at Easton, county of Northampton, and State of Pennsylvania, have invented a certain new and useful Electric Valve Apparatus, of which the following is a specification.

The present invention relates to apparatus for controlling the flow of steam or other fluid through any suitable pipe or system of pipes.

The main object of the invention is to provide improved devices for opening and closing valves, and especially radiator-valves for use in connection with steam-heating systems, although the valves to be described may be used for water, gas, or other systems.

The invention consists in an improved arrangement and combination of magnets, levers, and other operating parts in the manner hereinafter described and claimed, whereby the valve can be closed, locked, and opened easily, notwithstanding pressure in the pipes.

In the accompanying drawings, illustrating the invention, Figure 1 is a side view of the preferred form of valve mechanism, a part of the magnets being broken away to more clearly show the construction, showing also a radiator, thermostat, and electric circuits. Fig. 2 is a view of the valve mechanism at right angles to Fig. 1, looking from the right. Figs. 3 and 4 are side views, with parts broken away, of modified forms of valve mechanism.

In my well-known automatic heat-regulating system each valve is controlled by two magnets, one of which closes the valve and the other of which opens or releases the same. The magnets are in circuits controlled by a thermostatic circuit-controller which closes the circuit to one magnet on a predetermined change of temperature, thereby energizing that magnet and closing or opening the valve. A second circuit-controller is operated by such movement of the valve or valve-controlling devices to break the circuit of the operating-magnet at the valve and to close the circuit of the other magnet at the valve, holding the latter circuit closed at said point until the thermostatic circuit-controller moves to its opposite extreme, closing the circuit on that side and energizing the second magnet. The valves to be described herein are especially adapted for use in such a system.

In my Patent No. 476,573, dated June 7, 1892, is shown a valve mechanism for use in systems of the character indicated, which is more especially designed for systems employing a pressure of, say, fifty pounds or over. In that apparatus a toggle and a system of levers are used for communicating motion from one armature to the valve for closing it, and other levers operated by a second armature for bending the toggle, so that the pressure in the pipes or a spring can operate to open the valve. Said apparatus is very efficient, but for use with radiators it is desirable to reduce the size of the apparatus, so that its appearance may not be objectionable, but such apparatus must be adapted to close absolutely tight against pressure in the system, and such compact and simplified apparatus constitutes the present improvement.

In Figs. 1 and 2 of the drawings, which show my preferred form of valve mechanism, 1 is an iron plate secured on the outside of the valve-bonnet, below which the valve-body 2, having an inlet-port 3 and an outlet-port 4, is mounted. Said plate supports and forms the yokes of two electromagnets 6 7, the two limbs of each magnet being connected to the plate 1 by suitable bolts 8. These magnets stand in planes parallel with the valve-rod, and their armatures move in such planes, or substantially so.

By securing the valve-controlling apparatus as described it will always occupy a definite fixed position in relation to the valve, so that when the apparatus is once set up there is no danger of the parts getting out of adjustment.

Above the plate 1 is a brass or other metal frame 9, which is substantially rectangular, the upper cross-bar 10 being provided at the center with an opening in which the plunger 11, which is connected to the valve-rod 12, carrying a suitable valve, can slide, such connection being made by means of the spring 15 within the hollow portion of plunger 11, said spring pressing at its lower end, when the valve is open, on a disk and through the disk on the nut 13 and at its upper end pressing upward against the plunger. The nut 13, which is adjustable, is screwed onto the lower end of the plunger 11, and the rod 12 passes loosely through the nut and terminates in a disk adapted to bear against the one above mentioned. The spring, when the valve is open, does not bear on the valve-rod, but when the valve is moved toward its seat, the rod moves up into the nut, so that the disk on its end presses against the spring, so that the spring is compressed when the valve reaches its seat. The strength of the spring will depend on the pressure in the system to be controlled. In the lower side 17 of the rectangular frame is an opening through which the valve rod or stem passes.

The upper end of the plunger 11 is provided with a head 18, to which the lever 19, at right angles to the valve-stem, is pivoted or otherwise operatively connected in such manner that it can press down on the plunger to reciprocate it. The lever 19, which is in this case of the third order, has a pivot or fulcrum 20, and has a projecting end 21, which extends between the two posts 22 23 in such manner that the locking or catch lever 24 is adapted to engage and hold said lever when it is in its lower position. On the lever 19, between the head 18 and fulcrum 20, is an armature 25 in position to coöperate with the magnet 6.

26 is a spring which aids in raising the armature and armature-lever when they are released.

The locking-lever 24 is pivoted at 27 and has a right-angle arm 28, which carries the armature 29 and the switch-lever 30, the latter having a contact-spring 31 in one position resting on the insulating-plate 32 and in its forward position bearing on the contact-plate 33, which is connected by wire 34 to the magnet 6, the opposite terminal of which is connected by wire 44 to contact 45 of thermostat T, which is in position to be affected by the temperature maintained by radiator R. The thermostat-bar 48 and battery 49 are connected by wire 50 to the frame 9, and hence to springs 31 34′. The lever 19 also carries a contact-spring 34′, which, in the position shown, bears on a contact-plate 35, which is connected by wire 36 to the magnet 7, the opposite terminal of which is connected by wire 46 to contact 47. When the arm 19 is allowed to rise, the spring 34′ will move off from contact 35. The armature 29 stands above the poles of magnet 7 and in position to be attracted thereby when the lever 24 is in engagement with lever 19.

In the position shown the magnet 6 has been energized, attracting its armature, moving the lever 19 and the plunger 11 down, closing the valve, and allowing the lock or catch lever 24 to be pressed forward by spring S over the end of said lever 19, and closing the circuit of magnet 7 at contact 35. The parts will retain this position until the circuit of magnet 7 is closed at a thermostat or other circuit-controller, when the armature 29 will be attracted, turning lever 24 on its pivot, thereby releasing lever 19, allowing the valve to open. At the same time that the latter is released the circuit-closing spring 31 is carried onto contact 33, closing the circuit at this point to magnet 6.

The main advantage of the arrangement described lies in the fact that the power is applied to the valve in a direct and positive manner with advantageous arrangement of levers and with great economy of space. The lock is made to engage the valve-operating lever at a distance from its fulcrum greater than the valve-stem. This reduces the frictional resistance between the two levers. This arrangement also makes safer adjustment easier than it would be if the lock engaged between the valve and fulcrum. With this arrangement also the lost motion necessary to provide proper engagement between the valve and locking levers is reduced and its effect at the valve made practically inappreciable. It also enables me to adjust the parts so that the magnets do not feel the resistance of spring 15 until the valve-lever is almost in position to be locked. When the armature 25 begins to move, the only resistance encountered is that due to the expanded spring 26 and the friction of the plunger and valve-stem, which is packed to prevent escape of fluid from the valve-box. When, however, the valve reaches its seat, so that further movement requires compression of the spring 15, the armature is so near the ends of the magnet-poles that the maximum amount of power which it can exert by means of the current employed is utilized. The power required to operate armature 29 to release the locking device is less than that required to close the valve.

In Fig. 3 the lever 19′, corresponding to 19, is of the first order, instead of the third order, as in Fig. 1, being pivoted at 20′ and having the armature 25 connected thereto at the point 37 by the reciprocatory rod 38. The lever 19′ in this case passes through an opening in the block or head 18′, secured to the valve-rod 12 and extended so as to be engaged by the detent or locking-catch 24, secured to and operated in one direction by the armature 29 and in the opposite direction by the spring S. In the upper cross-bar of the frame is secured a hollow adjustable sleeve 39, in which is a spring 40, which presses down onto the top of the head 18′. This spring is made long to give uniform tension, and has sufficient strength to withstand the entire pressure of the steam or fluid in the pipes under control when said spring is under its normal degree of tension. To open the valve, which is held open by arm 24, instead of closed, as in Figs. 1 and 2, the armature 25 must be moved down to the position shown in Fig. 3, raising the lever 19′, compressing said spring 40, and allowing the catch 24 to move forward under the end of lever 19′. This arrangement is only desirable in systems where the pressure is comparatively low, since in high-pressure systems the spring 40 would have to be of such strength that large battery-power would be required to move the armature. In this case the lever acts on the valve-rod without the interposition of a spring such as used in the construction shown in Figs. 1 and 2. The circuit connections are identical with those of Fig. 1, except that wire 44 is connected to contact 47 and wire 46 to contact 45, owing to the fact that in one case the valve is held closed by the arm 24 and in the other it is held open.

Instead of causing the armature 25 to act directly on the pivoted lever crossing the frame at an angle to the valve-rod, it may be so arranged as to act directly on the reciprocatory valve-rod and indirectly on said lever. One way of accomplishing this is indicated in Fig. 4, in which the armature 25 is placed at the end of plunger 11, connected to the valve-rod 12, as shown in Fig. 1, a spring 43 being provided to raise the armature when the valve is released. A lever 19″ is pivoted to the frame at 20″, being connected to the plunger, for example, by a pin 41, projecting from the plunger into elongated slots 42. The end of this lever farthest from its pivot is adapted to be engaged by the locking-lever 24 in a manner similar to that described in connection with the other figures, and it will be evident that the friction between the levers 19″ and 24 will be small, and that sufficiently accurate adjustment of the mechanism can be very readily attained, as in the valve mechanism first described.

What I claim is—

1. In a valve-controlling device, the combination with the valve, of a frame carrying two magnets and two armature-levers, the armature-lever of one of the magnets controlling the valve and provided with a contact controlling the circuit of the second magnet only, the armature-lever of the second magnet operating as a lock for the armature-lever of the first magnet and provided with a contact controlling the circuit of the first magnet only, one of the said contacts being made when the other is broken, whereby but one magnet can be energized at the closing of the circuit, substantially as set forth.

2. In a valve-controlling device, the combination with the valve, the frame carrying two magnets and armature-levers, the armature-lever of one of the magnets controlling the valve and provided with a contact controlling the second magnet only, the armature-lever of the second magnet being provided with a contact controlling the circuit of the first magnet only, the armature-lever of the first magnet when in position to close the valve being locked by the lever of the second magnet, and when in position to open the valve itself serving as a lock for holding the armature-lever of the second magnet in position to make its contact, substantially as set forth.

3. In a valve device the combination with the bonnet, of a frame mounted thereon and supporting the magnets, uprights attached to the frame, a cross-piece connected to the uprights and forming a guide for the valve-stem, armature-levers connected to the uprights and carrying the contacts, one of the levers acting as a lock for the other and connections between the latter lever and the valve-stem, substantially as described.

This specification signed and witnessed this 4th day of June, 1892.

JOHN V. STOUT.

Witnesses:
CHARLES M. CATLIN,
EUGENE CONRAN.